US011783789B1

(12) United States Patent
Rao et al.

(10) Patent No.: US 11,783,789 B1
(45) Date of Patent: Oct. 10, 2023

(54) DYNAMIC BRIGHTNESS COMPENSATION IN DISPLAY ASSEMBLY

(71) Applicant: META PLATFORMS TECHNOLOGIES, LLC, Menlo Park, CA (US)

(72) Inventors: Linghui Rao, Redmond, WA (US); Alexander Klement, Kenmore, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/744,054

(22) Filed: May 13, 2022

(51) Int. Cl.
G09G 3/34 (2006.01)
G02B 27/00 (2006.01)
G02B 27/01 (2006.01)

(52) U.S. Cl.
CPC ....... *G09G 3/3426* (2013.01); *G02B 27/0093* (2013.01); *G02B 27/0172* (2013.01); *G02B 2027/0178* (2013.01); *G09G 2320/0646* (2013.01)

(58) Field of Classification Search
CPC ......... G09G 3/3426; G09G 2320/0646; G02B 27/0093; G02B 27/0172; G02B 2027/0178
See application file for complete search history.

(56) References Cited

U.S. PATENT DOCUMENTS

| 8,225,229 | B2 * | 7/2012 | Thorn | G06F 1/3265 |
| | | | | 715/767 |
| 3,289,270 | A1 | 10/2012 | Wallener et al. | |
| 8,670,006 | B2 | 3/2014 | Hong et al. | |
| 8,982,036 | B2 | 3/2015 | Kim et al. | |
| 9,870,740 | B2 | 1/2018 | Park et al. | |
| 2006/0132424 | A1 * | 6/2006 | Foo | G02F 1/13318 |
| | | | | 345/102 |
| 2010/0295839 | A1 | 11/2010 | Nagaya et al. | |
| 2019/0019023 | A1 * | 1/2019 | Konttori | G06V 10/141 |
| 2020/0074941 | A1 * | 3/2020 | Takahashi | G09G 3/36 |
| 2022/0147142 | A1 * | 5/2022 | Bui | G09G 3/3406 |
| 2022/0197377 | A1 * | 6/2022 | Kim | G09G 3/2092 |
| 2022/0291744 | A1 * | 9/2022 | Sugihara | G06F 3/01 |

* cited by examiner

*Primary Examiner* — Towfiq Elahi
(74) *Attorney, Agent, or Firm* — Fenwick & West LLP

(57) ABSTRACT

Embodiments of the present disclosure relate to a display assembly with dynamic brightness compensation. The display assembly includes a display element, a controller, and a backlight device. The controller obtains gaze information for a user's eye, generates emission instructions based at least in part on the gaze information, and dynamically assigns at least a portion of a plurality of light sources in the backlight device to a plurality of regions based at least in part on the gaze information. The light sources emit light through the display element, and the display element spatially modulates the light received from the backlight device to generate image light. Each subset of the light sources dynamically assigned to a respective region emits a portion of the light having brightness adjusted by a respective adjustment value in accordance with the emission instructions.

13 Claims, 11 Drawing Sheets

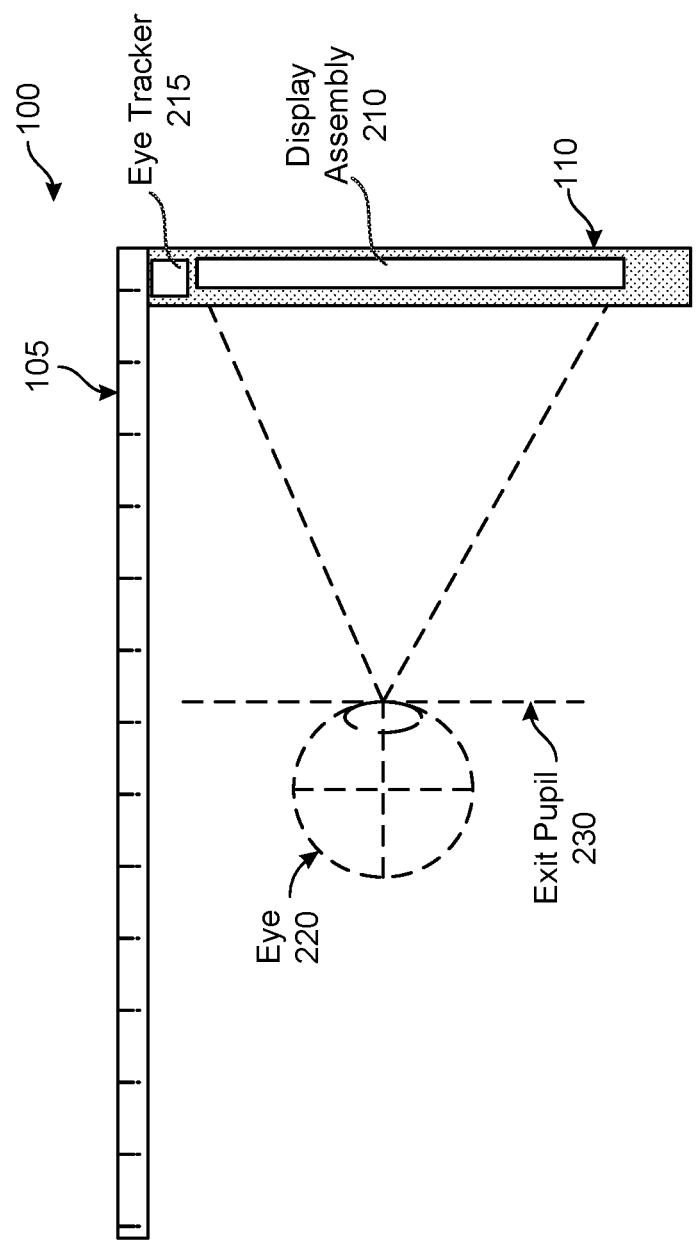

DYNAMIC BRIGHTNESS COMPENSATION IN DISPLAY ASSEMBLY

FIELD OF THE INVENTION

The present disclosure relates generally to a display device, and specifically relates to dynamic brightness compensation in a display assembly.

BACKGROUND

Common display technologies include liquid crystal displays (LCDs), organic light emitting diode (OLED) displays, and projection systems. Some display technologies include backlights that illuminate a spatial light modulator (SLM). LCDs are an example SLM. Displays with backlights can be also integrated into head-mounted displays (HMDs) for, e.g., artificial reality applications. However, display brightness in HMDs drops at off-axis due to lenses and lens technology employed in HMDs. Compensation and adjustment (e.g., increase or decrease) in display brightness are therefore desirable in displays with backlights.

SUMMARY

Embodiments of the present disclosure relate to a display assembly with dynamic brightness compensation. The display assembly may include a display element, a controller and a backlight device. The controller may obtain gaze information for a user's eye, generate emission instructions based at least in part on the gaze information, and dynamically assign at least a portion of a plurality of light sources in the backlight device to a plurality of regions based at least in part on the gaze information. The light sources may emit light through the display element, and the display element may spatially modulate the light received from the backlight device to generate image light. In some embodiments, the light sources are part of the display element and directly emit the image light, and the display assembly does not include the backlight device. Each subset of the light sources dynamically assigned to a respective region may emit a portion of the light having brightness adjusted by a respective adjustment value in accordance with the emission instructions. The display assembly may be part of a head-mounted display.

BRIEF DESCRIPTION OF THE DRAWINGS

FIG. 2A is a cross-sectional view of the HMD illustrated in FIG. 1A or FIG. 1B, according to some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The brightness of light-emitting diodes (LEDs) in a backlight device of a display assembly is controlled to compensate the drop in the brightness of light incident on a user's pupil as the user's pupil gazes away from a center of a display element (i.e., display panel) in addition to compensating the uneven brightness across the display element due to the placement of optics between the backlight device and the user's pupil. The backlight device may be dynamically assigned to multiple regions including a center region of the user's gaze and peripheral regions that change based on the direction of the user's gaze. Subsets of LEDs in the backlight device assigned to these regions are updated dynamically according to the user's gaze.

The display assembly presented herein may be integrated into a wearable device (e.g., a head-mounted display (HMD) or a headset), a mobile device, or any other hardware platform capable of providing artificial reality content to a user.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

Figure 1A:
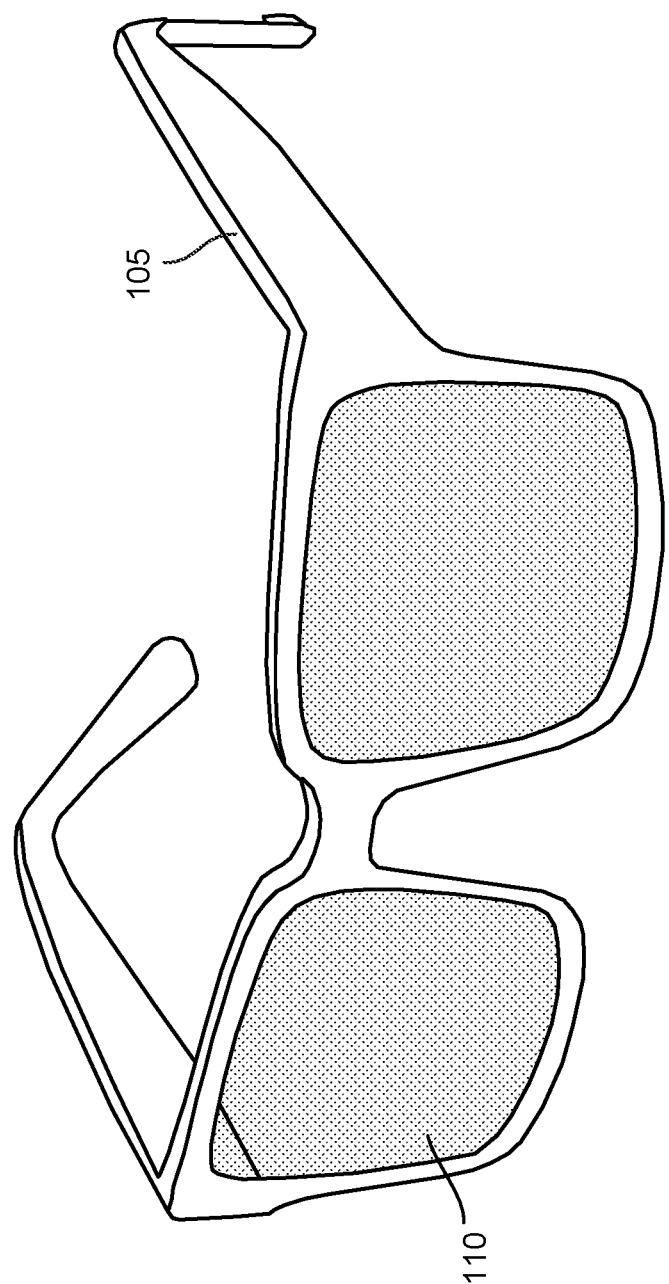
FIGS. 1A and 1B are diagrams of head-mounted displays (HMDs) that include near-eye displays (NEDs), according to some embodiments.
Figure 1B:
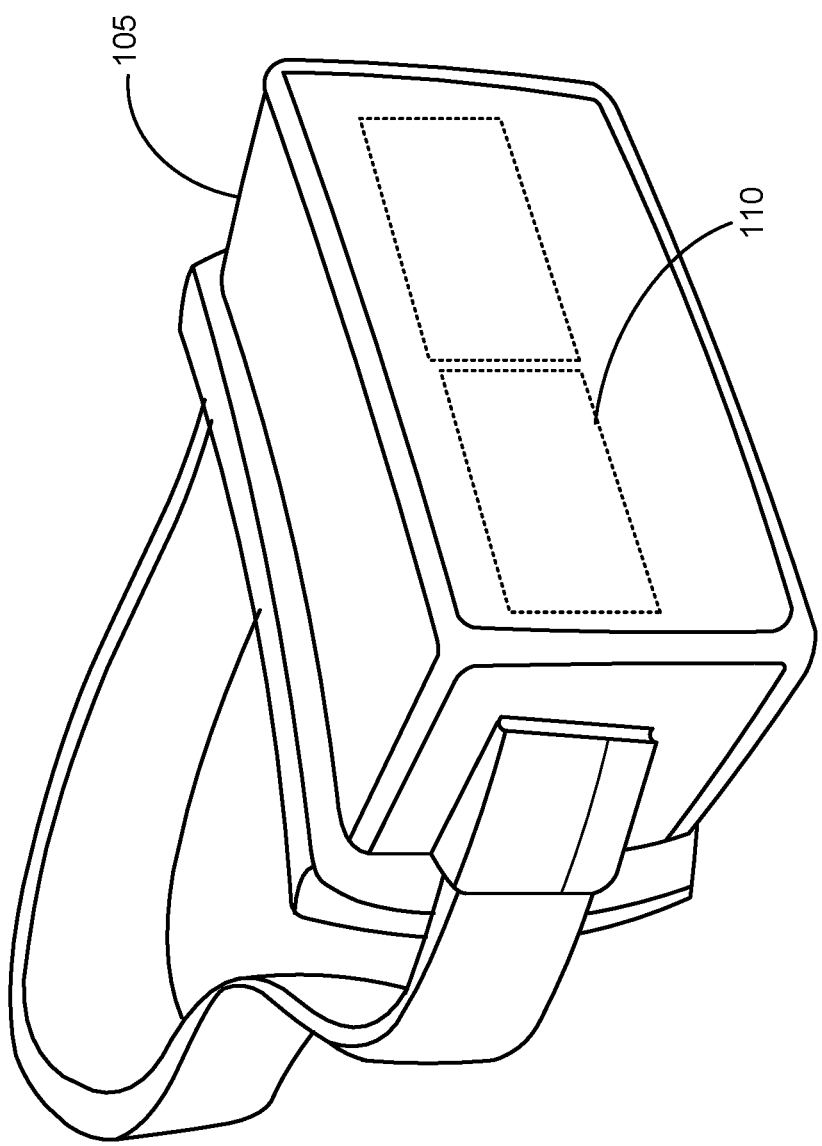

FIGS. 1A and 1B are diagrams of head-mounted displays (HMDs) 100 that include near-eye displays (NEDs) 110, according to some embodiments. The NED 110 may present media to a user. Examples of media that may be presented by the NED 110 include one or more images, video, audio, or some combination thereof. In some embodiments, audio may be presented via an external device (e.g., speakers and/or headphones) that receives audio information from the HMD 100, a console (not shown), or both, and presents audio data to the user based on the audio information. The HMD 100 is generally configured to operate as a VR HMD. However, in some embodiments, the HMD 100 may be modified to also operate as an AR HMD, a MR HMD, or some combination thereof. For example, in some embodiments, the HMD 100 may augment views of a physical, real-world environment with computer-generated elements (e.g., still images, video, sound, etc.).

The HMD 100 shown in FIG. 1A or FIG. 1B may include a frame 105 and a display 110. The frame 105 may include one or more optical elements that together display media to a user. That is, the display 110 may be configured for a user to view the content presented by the HMD 100. As discussed below in conjunction with FIG. 2A, the display 110 may include at least one source assembly to generate image light to present optical media to an eye of the user. The source assembly may include, e.g., a source, an optics system, or some combination thereof.

FIGS. 1A and 1B are merely examples of a virtual reality system, and the display systems described herein may be incorporated into further such systems.

FIG. 2A is a cross section 200 of the HMD 100 illustrated in FIG. 1A or FIG. 1B, according to some embodiments. The cross section 200 may include at least one display assembly 210, an eye tracker 215, and an exit pupil 230. The exit pupil 230 is a location where an eye 220 may be positioned when a user wears the HMD 100. In some embodiments, the frame 105 may represent a frame of eye-wear glasses. For purposes of illustration, FIG. 2A shows the cross section 200 associated with a single eye 220 and a single display assembly 210, but in alternative embodiments not shown, another display assembly that is separate from or integrated with the display assembly 210 shown in FIG. 2A, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the HMD 100.

The eye tracker 215 tracks a position of the eye 220. Although only one eye 220 of the user is shown in FIG. 2A, in some embodiments, the eye tracker 220 may track a position for each eye 220 of the user. In some embodiments, separate eye tracker 215 may be implemented for each eye 220 of the user.

In alternate configurations, the HMD 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as an organic light-emitting diode (OLED). In accordance with various embodiments, the display assembly 210 may be implemented as a liquid crystal display (LCD) assembly, OLED display assembly, or some other type of display assembly configured to emit color image light to the eye 220. More details about a structure and operation of the display assembly 210 are provided below in relation to FIG. 2B.

Figure 2B:
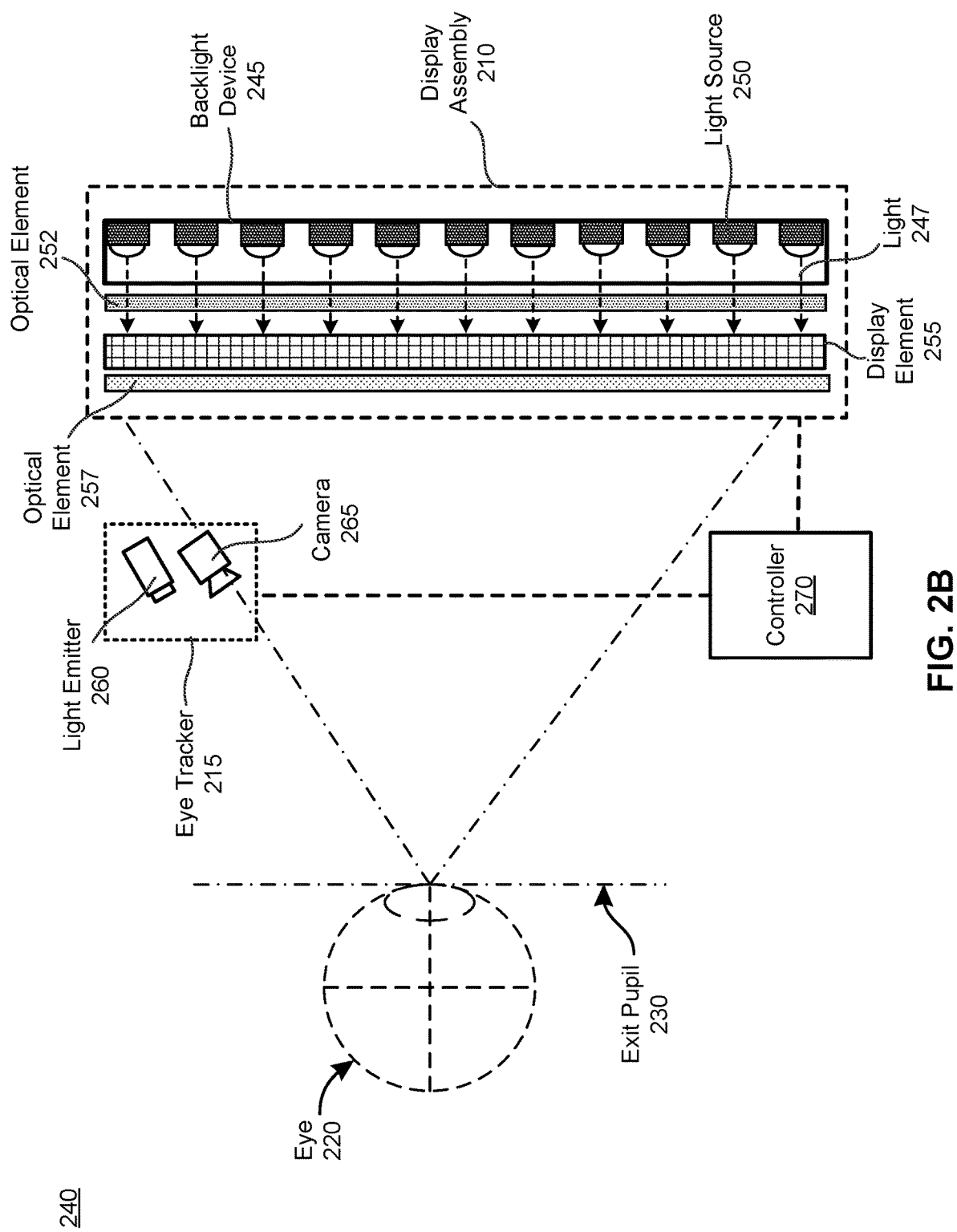
FIG. 2B is a cross-sectional view of a display assembly with a backlight device, which may be part of the HMD illustrated in FIG. 1A or FIG. 1B, according to some embodiments.

FIG. 2B is a cross-sectional view 240 of the display 110, according to some embodiments. The cross-sectional view 240 shows components of the display assembly 210 and the eye tracker 215, as well as a controller 270 coupled to the display assembly 210 and the eye tracker 215. The display assembly 210 may include a backlight device 245, an optical element 252, a display element 255, and an optical element 257.

The backlight device 245 may emit light 247 through the display element 255. The backlight device 245 may include a plurality of light sources 250 that generate the light 247, e.g., based at least in part on emission instructions from the controller 270. The light sources 250 may be organized as a one-dimensional or two-dimensional array of light sources. The light sources 250 may be LEDs, mini-LEDs, superluminescent LEDs (SLEDs), OLEDs, some other type of light sources, or combination thereof. The light sources 250 may be configured to generate the light 247 as white light (visible light). The light sources 250 may include LEDs that include yellow phosphor illuminated by a blue LED dye to generate white light. The light sources 250 may include red-green-blue (RGB) LED dyes that are included in the same electronics package or discrete red, green, and blue LEDs in separate electronic packages that are positioned close enough so that a "mixing distance" of the red, green, and blue light emitted from the red, green, and blue LEDs mixes into white light before the light 247 encounters the display element 255. In some implementations, the light sources 250 are blue LEDs configured to illuminate quantum dots to generate white light.

The optical element 252 may be disposed between the backlight device 245 and the display element 255 for, e.g., diffusing and/or polarizing the light 247 emitted from the backlight device 245. The optical element 252 may include one or more optical layers such as one or more optical diffuser films and/or one or more polarizing films.

The display element 255 may be a display panel that spatially modulates the light 247 received from the backlight device 245 to generate image light (e.g., content). The display element 255 may be an LCD, an active-matrix liquid crystal display (AMLCD), or some other type of display that spatially modulates received light. In some embodiments, the display element 255 includes a color filter array overlaying a liquid crystal array. The color filter array may be, e.g., a Bayer pattern, or some other color pattern. The light 247 from the backlight device 245 may be modulated by the color filter array and the liquid crystal array to form the image light. In some embodiments, the optical element 257 includes the color filter array. The display element 255 emits the image light towards the optical element 257. In some embodiments, the display element 255 incudes the light sources 250 (e.g., OLEDs) that directly emit the image light (content). In such cases, the display element 255 may be, e.g., an OLED display, and the backlight device 245 may be omitted from the display assembly 210.

The optical element 257 may magnify the image light received from the display element 255, correct optical errors associated with the image light, and present the corrected image light to a user of the HMD 100. The optical element 257 directs the magnified and/or corrected image light to the exit pupil 230 for presentation to a user wearing the HMD 100. In various embodiments, the optical element 257 can be implemented as one or more optical elements. Example optical elements included in the optical element 257 may include: an aperture, a Fresnel lens, a convex lens, a concave lens, a filter, a reflecting surface, or any other suitable optical element that affects image light.

The eye tracker 215 that tracks a position of the eye 220 may include a light emitter 260 and a camera 265. The light emitter 260 emits light toward the exit pupil 230. The light emitter 260 may illuminate the eye 220 with, e.g., infrared (IR) light, and IR light reflected/scattered by at least one surface (e.g., pupil) of the eye 220 may be captured by the camera 265. In some embodiments, the light emitter 260 is implemented to illuminate the eye 220 such that glints off a cornea of the eye 220 may be captured by the camera 265. In some embodiments, the light emitter 260 emits structured light. In alternative embodiments, the light emitter 260 emits pulses of light that are used to determine depth via time of flight. The light emitter 260 may include one or more light sources, such as one or more LEDs, organic LEDs, microLEDs, some other type of light source, or some combination thereof. The camera 265 captures images of the eye 220. The camera 265 may be, e.g., an array (one-dimensional or two-dimensional) of photodiodes, a charge coupled display (CCD) array, some other device capable of detecting light, or some combination thereof. The camera 265 may be configured to detect light in the IR band. The camera 265 may capture the images in accordance with instructions received from the controller 270.

The controller 270 may control components of the display assembly 210 and the eye tracker 215. The controller 270 may generate tracking instructions for the light emitter 260 and the camera 265 of the eye tracker 215. In some embodiments, the controller 270 receives one or more images of the eye 220 captured by the camera 265. The controller 270 may determine eye tracking information for the eye 220 using images from the camera 265. For example, the controller 270 identifies locations of reflections of light from the light emitter 260 in an image of the eye 220. The controller 270 determines a position and an orientation of the eye 220 based on the shape and/or locations of the identified reflections. The determined position and an orientation of the eye 220 can be referred to herein as "gaze information" or "gaze position," and may comprise information about a position and/or orientation of one or more surfaces (e.g., pupil) of the eye 220. In cases where a target region of the eye 220 is illuminated with a structured light pattern emitted from the light emitter 260, the controller 270 can detect distortions of the structured light pattern projected onto the eye 220, and estimate a gaze position for the eye 220 based on the detected distortions. The controller 270 can also estimate a pupillary axis, a gaze angle (e.g., corresponds to a foveal axis), a translation of the eye 220, a torsion of the eye 220, and a current shape of the eye 220 based on one or more images captured by the camera 265. Alternatively, the eye tracker 215 includes a controller coupled to the light emitter 260 and the camera 265. The internal controller of the eye tracker 215 may determine the gaze information for the eye 220, and provide the gaze information (i.e., information about the gaze position) to the controller 270.

The controller 270 may further generate emission instructions for the display assembly 210 based at least in part on the gaze information for the eye 220. The controller 270 may provide the emission instructions to, e.g., the light sources 250 of the backlight device 245. The emission instructions from the controller 270 may include electrical signals (e.g., voltage signals or current signals) that control light emission from the light sources 250 of specific brightness levels. For example, the electrical signals having higher amplitude levels (e.g., higher voltage levels or higher current levels) generated by the controller 270 and provided to a corresponding subset of the light sources 250 may cause light sources 250 of the corresponding subset to emit a portion of the light 247 having a higher brightness level. And, vice versa for the electrical signals generated by the controller 270 having lower amplitude levels.

In some embodiments, the controller 270 dynamically assigns at least a portion of the light sources 250 to multiple brightness regions using the emission instructions. Each subset of the light sources 250 dynamically assigned to a respective brightness region in accordance with the emission instructions (i.e., based on the gaze information for the eye 220) may emit a portion of the light 247 having brightness adjusted by a respective adjustment value in accordance with the emission instructions. The respective adjustment value may be in the range of, e.g., 0%-120% of a predetermined largest brightness value for an individual light source 250.

The controller 270 may be coupled to a non-transitory computer readable medium (i.e., memory) for storing, e.g., a look-up-table (LUT) with a list of adjustment values. A set of adjustment values from the list may be a function of the gaze information (e.g., information about gaze position or a position of pupil of a user's eye). Alternatively, the LUT with the list of adjustment values may be stored in an internal memory (e.g., non-transitory computer readable medium) of the controller 270. Once the controller 270 loads a particular set of adjustment values from the LUT, the controller 270 may map the loaded set of adjustment values into appropriate emission instructions (e.g., appropriate voltage and/or current signal levels) for controlling each subset of the light sources 250 dynamically assigned to the respective region to emit the portion of the light 247 having brightness adjusted by the respective adjustment value. Additional details about dynamically controlling brightness of portions of the light 247 emitted from the backlight device 245 based on the gaze information for the eye 220 are provided below in relation to FIGS. 5A-5B and FIG. 6.

Figure 3:
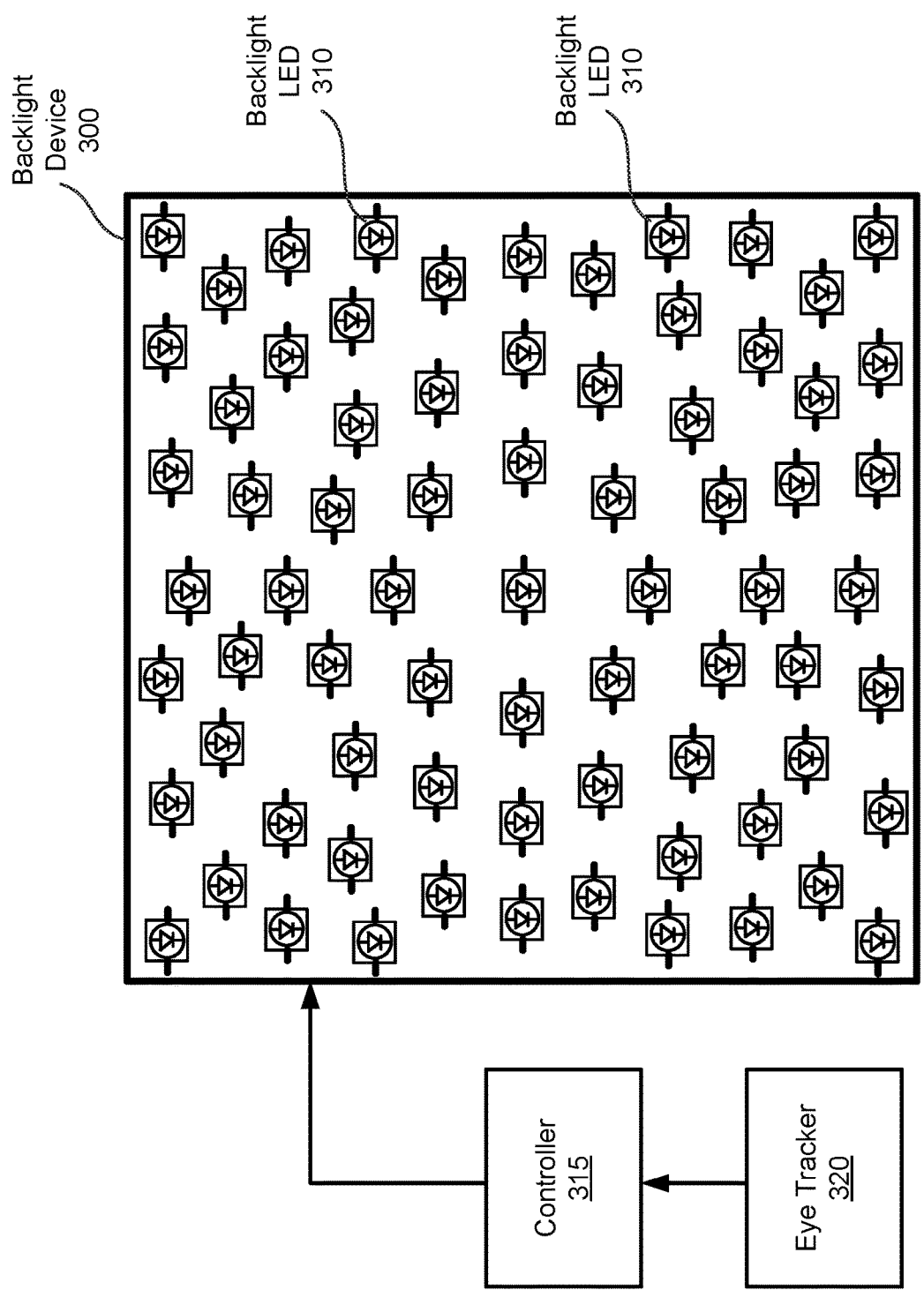
FIG. 3 illustrates an example backlight device with an array of backlight light emission diodes, according to some embodiments.

FIG. 3 illustrates an example backlight device 300 with an array of backlight LEDs 310, according to some embodiments. The backlight device 300 may be used as the backlight device 245, and the backlight LEDs 310 may be used as the light sources 250. The array of backlight LEDs 310 may be arranged on the backlight device 300 as a two-dimensional array of LEDs. Operations of the backlight LEDs 310 may be controlled by the controller 315 by providing emission instructions generated based at least in part on gaze information obtained from the eye tracker 320. The controller 315 may be configured as a driving circuit to drive the two-dimensional array of LEDs 310 using voltage signals and/or current signals. The controller 315 may be an embodiment of the controller 270, and the eye tracker 320 may be an embodiment of the eye tracker 215.

The array of backlight LEDs 310 may be used in direct-lit display architectures where the two-dimensional array of backlight LEDs 310 are arranged to illuminate a display pixel array (e.g., LCD display pixel array) that is shaped similarly to the backlight device 300. The two-dimensional backlight device 300 is illustrated as approximately square in FIG. 3, although the backlight device 300 may be rectangle, octagonal, hexagonal, or otherwise shaped in a suitable configuration (e.g., as in FIG. 4 and FIGS. 5A-5C) to illuminate a corresponding LCD (e.g., the display element 255) with illumination light. The two-dimensional array of backlight LEDs 310 may be spaced in rows and columns. For example, the two-dimensional array of backlight LEDs 310 may be configured as a 25×20 matrix totaling 500 LEDs. However, matrices of other sizes may be utilized. In some embodiments, a density of the two-dimensional array of backlight LEDs 310 is substantially uniform across the backlight device 300. In some other embodiments, the density of the two-dimensional array of backlight LEDs 310 is non-uniform across the backlight device 300. In some embodiments, the two-dimensional array of LEDs 310 includes one or more strings of white LEDs (emitting white visible light), or red/green/blue LEDs being spaced with a sufficient mixing distance to allow the red, green, and blue light to mix into white light for illuminating a display pixel array (e.g., the display element 255).

Figure 4:
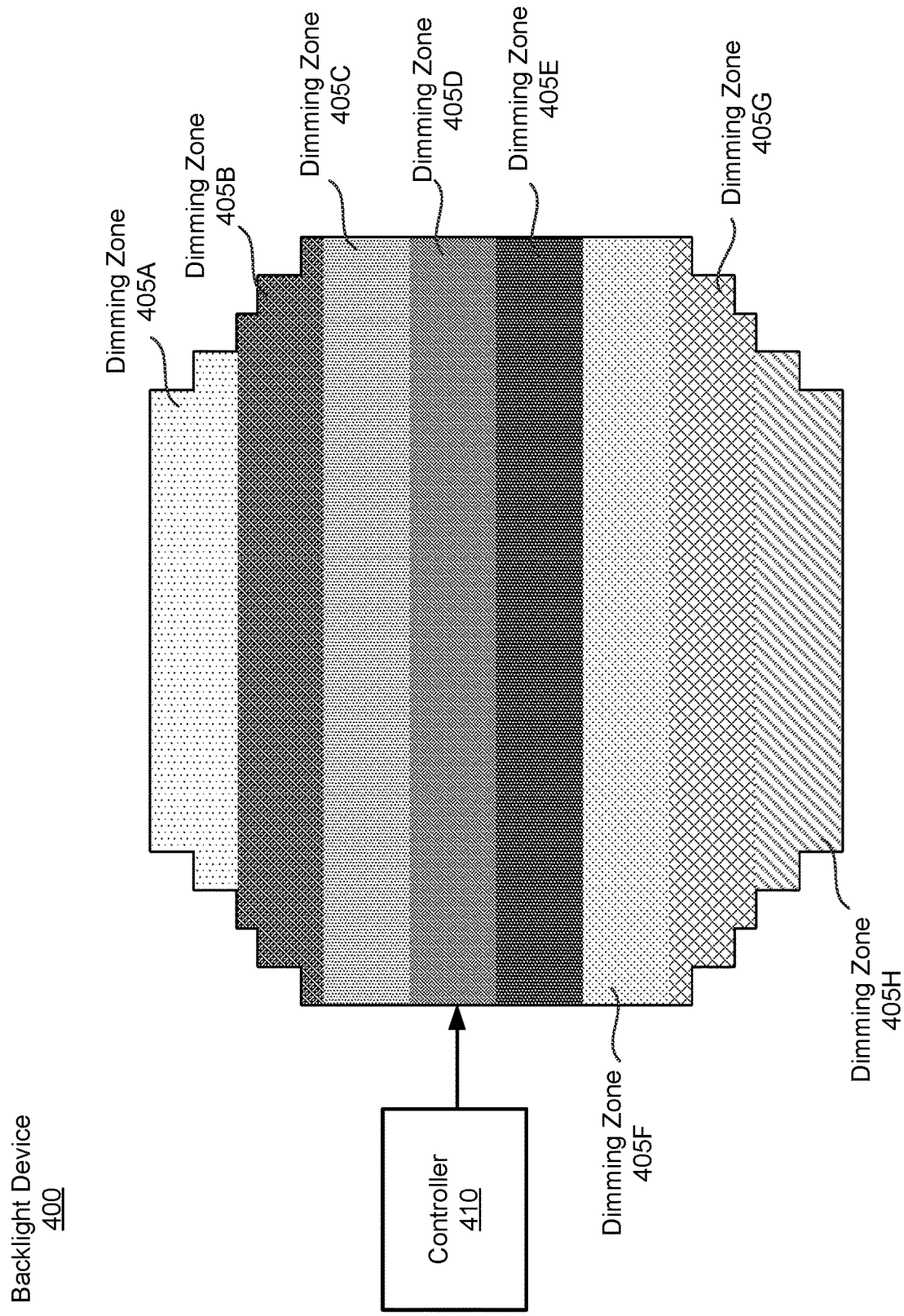
FIG. 4 illustrates an example backlight device with multiple dimming zones, according to some embodiments.

FIG. 4 illustrates an example backlight device 400 with multiple dimming zones, according to some embodiments. The backlight device 400 may be an embodiment of the backlight device 245 or the backlight device 300. The backlight device 400 may emit light having a predetermined brightness distribution profile that can be characterized with a set of diming zones, e.g., diming zones 405A, 405B, 405C, 405D, 405E, 405F, 405G, 405H, as shown in FIG. 4. Each dimming zone 405A-405H may be associated with a specific level of dimming (or brightness) of light emitted from a respective portion of light sources in the backlight device 400. Each dimming zone 405A-405H may be adjusted independently, e.g., based on emission instructions from a controller 410 coupled to the backlight device 400. In some embodiment, the controller 410 may utilize a specific algorithm to determine adjustment values for each dimming zone 405A-405H to improve the appearance of uniformity of light (e.g., appearance to a user's eye) generated by the backlight device 400. The controller 410 may be an embodiment of the controller 270 or the controller 315. FIG. 4 illustrates one possible distribution of dimming zones in the backlight device 400. Other distributions of dimming zones, as well as a different number of dimming zones from that shown in FIG. 4 are, however, possible.

Figure 5A:
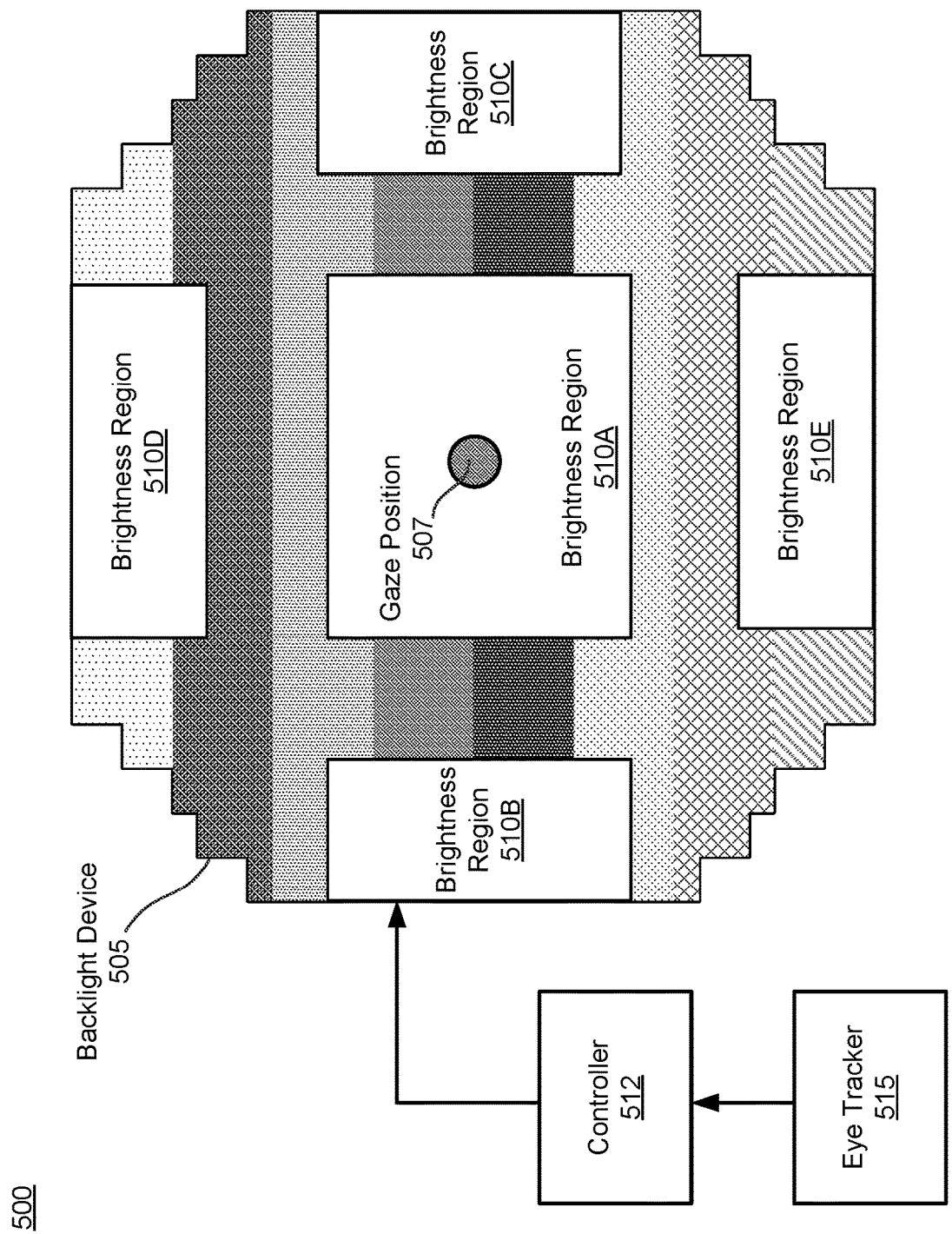
FIG. 5A illustrates a first example backlight device with different brightness regions for brightness compensation relative to a first gaze position for a user's eye, according to some embodiments.

FIG. 5A illustrates an example 500 of a backlight device 505 with different brightness regions for brightness compensation relative to a user's gaze position 507 (e.g., pupil position), according to some embodiments. The backlight device 505 may be an embodiment of the backlight device 245, the backlight device 300, or the backlight device 400. Without adjusting the brightness of light emitted from the brightness device 505, the brightness distribution profile of the light emitted from the backlight device 505 can be identical to that of the brightness device 400. Operation of the backlight device 505 may be controlled by a controller 512 by providing emission instructions generated based at least in part on the gaze position 507. The gaze position 507 may be determined by the controller 512 based on one or more images of a user's eye captured by the eye tracker 515. Alternatively, the eye tracker 515 may determine the gaze position 507 and provide information about the gaze position 507 to the controller 512. The controller 512 may be an embodiment of the controller 270, and the eye tracker 515 may be an embodiment of the eye tracker 215.

Based on information about the gaze position 507, the controller 512 may assign at least a portion of light sources in the backlight device 505 to multiple brightness regions, i.e., a brightness region 510A, brightness region 510B, brightness region 510C, brightness region 510D, and brightness region 510E, as shown in FIG. 5A. Each subset of the light sources in the backlight device 505 assigned to a respective brightness region 510A-510E may emit light having brightness adjusted by a respective adjustment value in accordance with the emission instructions from the controller 512. The controller 512 may use the emission instructions to set the respective adjustment value to a higher value for the respective brightness region 510A-510E that is further from a point of a gaze of the user's eye (i.e., the gaze position 507). Also, an adjustment value for the brightness region 510A that includes the gaze position 507 may the lowest among a set of adjustment values used for the brightness regions 510A-510E. The controller 512 may use the emission instructions to set the respective adjustment value for the respective brightness region 510A-510E based on a distance from a geometric center of the respective brightness region 510A-510E to the point of the gaze of the user's eye (i.e., to the gaze position 507).

Figure 5B:
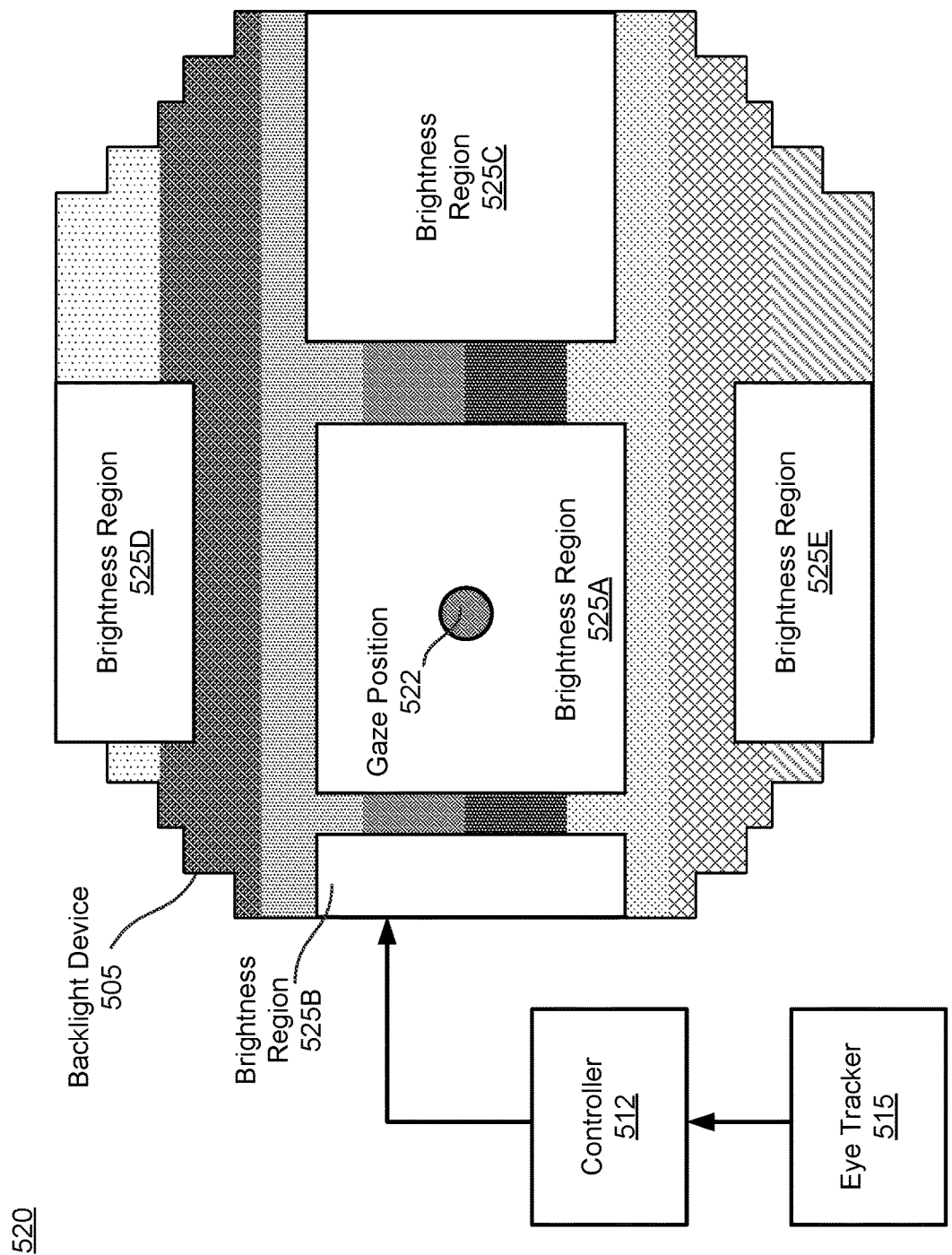
FIG. 5B illustrates a second example backlight device with different brightness regions for brightness compensation relative to a second gaze position for the user's eye, according to some embodiments.

FIG. 5B illustrates an example 520 of the backlight device 505 with different brightness regions for brightness compensation relative to a new gaze position 522 for the user's eye, according to some embodiments. Information about the new gaze position 522 is available at the controller 512. Based on the information about the new gaze position 522, the controller 512 may assign a different portion of light sources in the backlight device 505 to multiple brightness regions, i.e., a brightness region 525A, brightness region 525B, brightness region 525C, brightness region 525D, and brightness region 525E, as shown in FIG. 5B. Each subset of the light sources in the backlight device 505 assigned to a respective brightness region 525A-525E may emit a portion of light having brightness adjusted by a respective adjustment value in accordance with the emission instructions from the controller 512.

Each brightness region 525A-525E may represent an updated version of the respective brightness region 510A-510E, where a size, position within the backlight device 505 and/or respective adjustment value may be updated (or adjusted) based on information about the new gaze position 522. The controller 512 may use the emission instructions to adjust a size of each brightness region 510A-510E to obtain the respective brightness region 525A-525E. The controller 512 may adjust a size of each brightness region 510A-510E to obtain the respective brightness region 525A-525E as a function of a distance from a geometric center of each brightness region 510A-510E to the new gaze position 522. For example, a size of the brightness region 510B may be effectively decreased to obtain the brightness region 525B, while a size of the brightness region 510C may be effectively increased to obtain the brightness region 525C, as a geometric center of the brightness region 510B is closer to the gaze position 522 than a geometric center of the brightness region 510C. In this way, the appearance of uniformity of light emitted from the backlight device 505 that is later used to generate image light for presentation to the user is achieved.

Figure 5C:
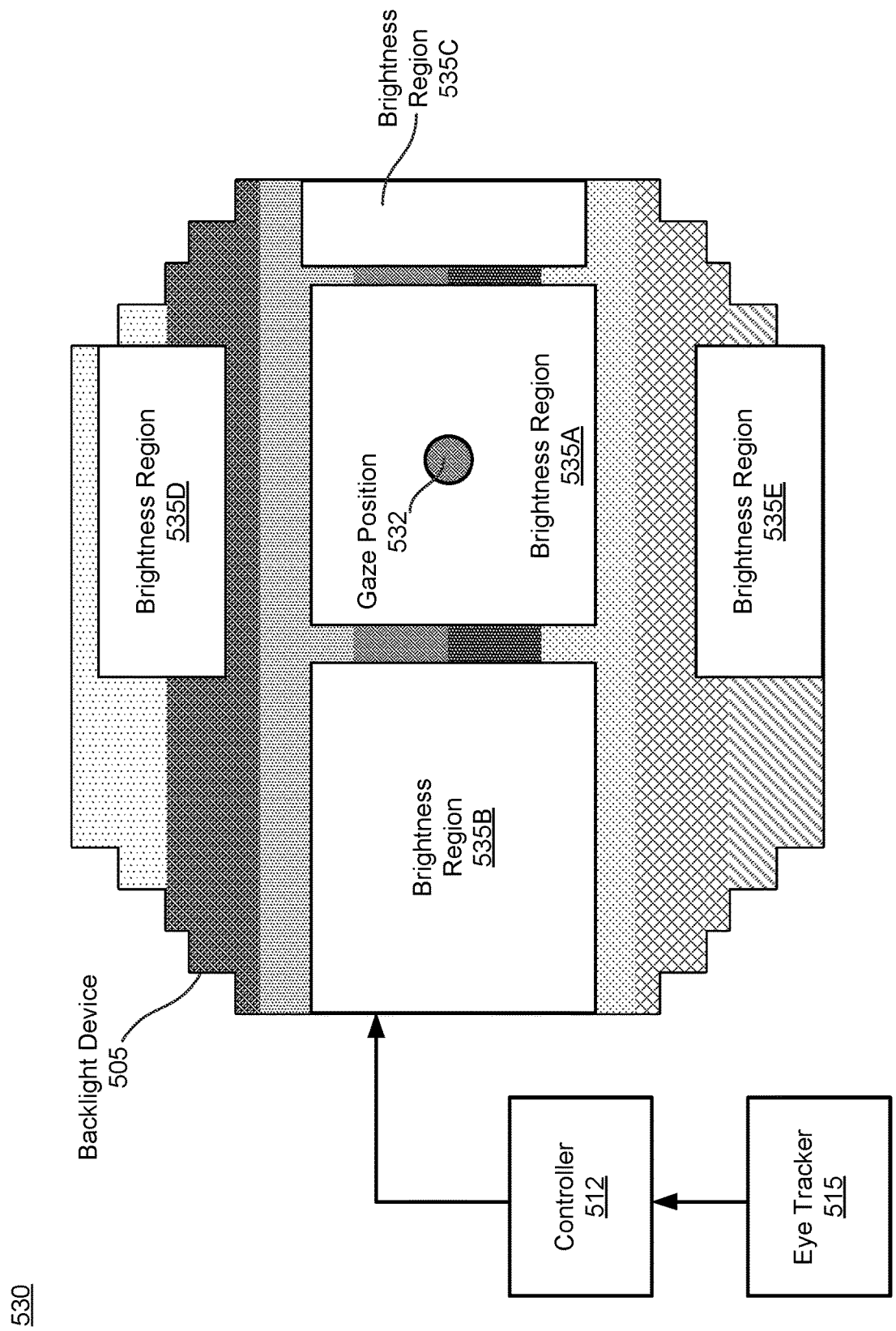
FIG. 5C illustrates a third example backlight device with different brightness regions for brightness compensation relative to a third gaze position for the user's eye, according to some embodiments.

FIG. 5C illustrates an example 530 of the backlight device 505 with different brightness regions for brightness compensation relative to a new gaze position 532, according to some embodiments. Information about the new gaze position 532 is available at the controller 512. Based on the information about the new gaze position 532, the controller 512 may assign another portion of light sources in the backlight device 505 to multiple brightness regions, i.e., a brightness region 535A, brightness region 535B, brightness region 535C, brightness region 535D, and brightness region 535E, as shown in FIG. 5C. Each subset of the light sources in the backlight device 505 assigned to a respective brightness region 535A-535E may emit a portion of light having brightness adjusted by a respective adjustment value in accordance with the emission instructions from the controller 512.

Each brightness region 535A-535E may represent an updated version of the respective brightness region 525A-525E, where a size, position within the backlight device 505 and/or respective adjustment value may be updated (or adjusted) based on information about the new gaze position 532. The controller 512 may use the emission instructions to effectively adjust a size of each brightness region 525A-525E to obtain the respective brightness region 535A-535E. The controller 512 may effectively adjust a size of each brightness region 525A-525E to obtain the respective brightness region 535A-535E as a function of a distance from a geometric center of each brightness region 510A-510E to the new gaze position 532. For example, a size of the brightness region 525B may be effectively increased to obtain the brightness region 535B, while a size of the brightness region 525C may be effectively decreased to obtain the brightness region 535C, as a geometric center of the brightness region 525B is further to the gaze position 532 than a geometric center of the brightness region 525C. In this way, the appearance of uniformity of light emitted from the backlight device 505 that is later used to generate image light for presentation to the user is achieved. It can be observed from FIGS. 5A-5C that a size of one of the brightness regions that includes the point of gaze (i.e., gaze position) is fixed, i.e., sizes of the brightness regions 510A, 525A and 535A are the same.

Figure 6:
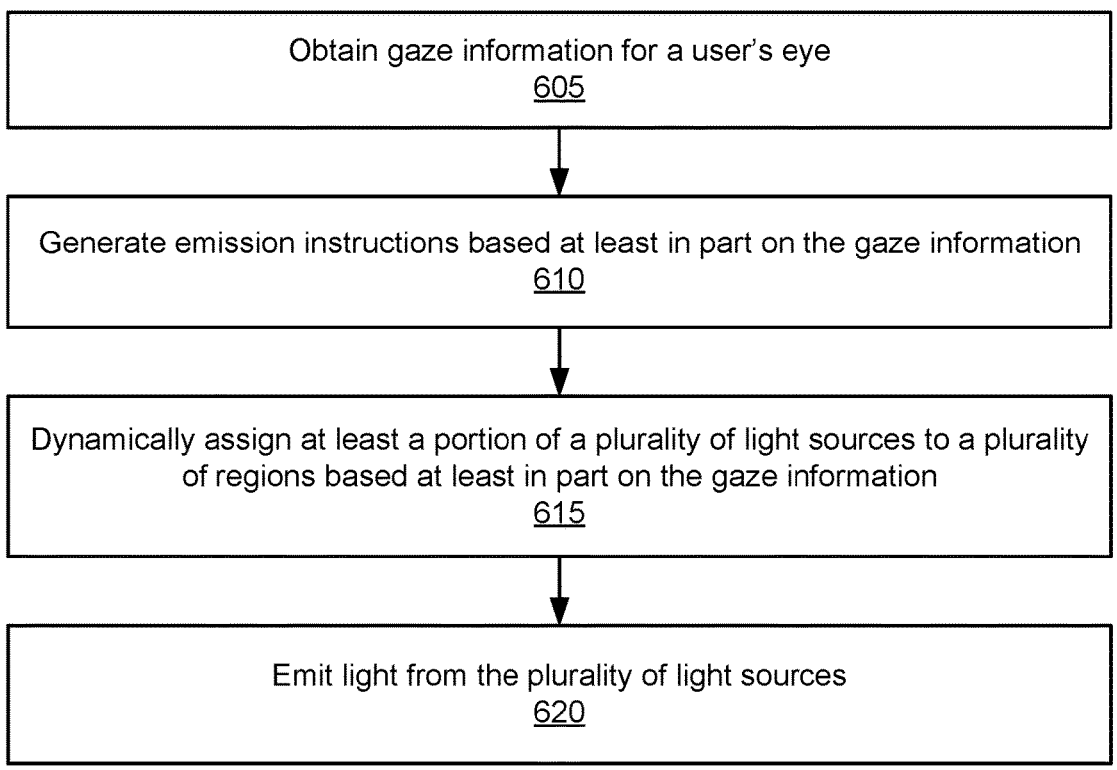
FIG. 6 is a flowchart illustrating a process of dynamic brightness compensation at a display assembly, according to some embodiments.

FIG. 6 is a flowchart illustrating a process 600 of dynamic brightness compensation at a display assembly, according to some embodiments. The process 600 shown in FIG. 6 may be performed by components of a display assembly (e.g., components of the display assembly 210). Other entities may perform some or all of the steps in FIG. 6 in other embodiments. Embodiments may include different and/or additional steps, or perform the steps in different orders.

The display assembly obtains 605 (e.g., via a controller) gaze information for a user's eye. The display assembly may be part of a headset, and the headset may further comprise an eye tracker configured to determine the gaze information, and provide the gaze information to the controller of the display assembly. The gaze information may comprise information about a position of a pupil of the user's eye.

The display assembly generates 610 (e.g., via the controller) emission instructions based at least in part on the gaze information. The display assembly may load (e.g., via the controller) a plurality of adjustment values from a non-transitory computer readable medium coupled to the controller based at least in part on the gaze information. The display assembly may generate (e.g., via the controller) the emission instructions using the loaded plurality of adjustment values.

The display assembly dynamically assigns 615 (e.g., via the controller) at least a portion of a plurality of light sources (e.g., in a backlight device or in a display element) to a plurality of regions based at least in part on the gaze information. Each of the light sources in the backlight device may comprise a LED. The plurality of light sources may comprise a two-dimensional array of LEDs or a two-dimensional array of OLEDs. The display assembly may adjust (e.g., via the controller) a size of the respective region based at least in part on the gaze information. The display assembly may adjust (e.g., via the controller) a size of the respective region as a function of a distance from a geometric center of the respective region to a point of a gaze of the user's eye included in the gaze information. A size of one of the regions that includes the point of the gaze may be fixed.

The display assembly emits 620 light from the plurality of light sources. In some embodiments, the backlight device includes the light sources that emit the light through a display element. The display element may spatially modulate the light received from the backlight device to generate image light (content). In some other embodiments, the light sources are part of the display element and directly emit image light (content). In such cases, the display assembly may not include the backlight device. Each subset of the light sources dynamically assigned to a respective region may emit a portion of the light having brightness adjusted by a respective adjustment value in accordance with the emission instructions. The display assembly may set (e.g., via the controller) the respective adjustment value to a higher value for the respective region that is further from a point of a gaze of the user's eye included in the gaze information. The display assembly may set (e.g., via the controller) the respective adjustment value to a lowest value among a plurality of adjustment values for the respective region that corresponds to the point of a gaze of the user's eye included in the gaze information. The display assembly may set (e.g., via the controller) the respective adjustment value based on a distance from a geometric center of the respective region to a point of a gaze of the user's eye included in the gaze information.

System Environment

Figure 7:
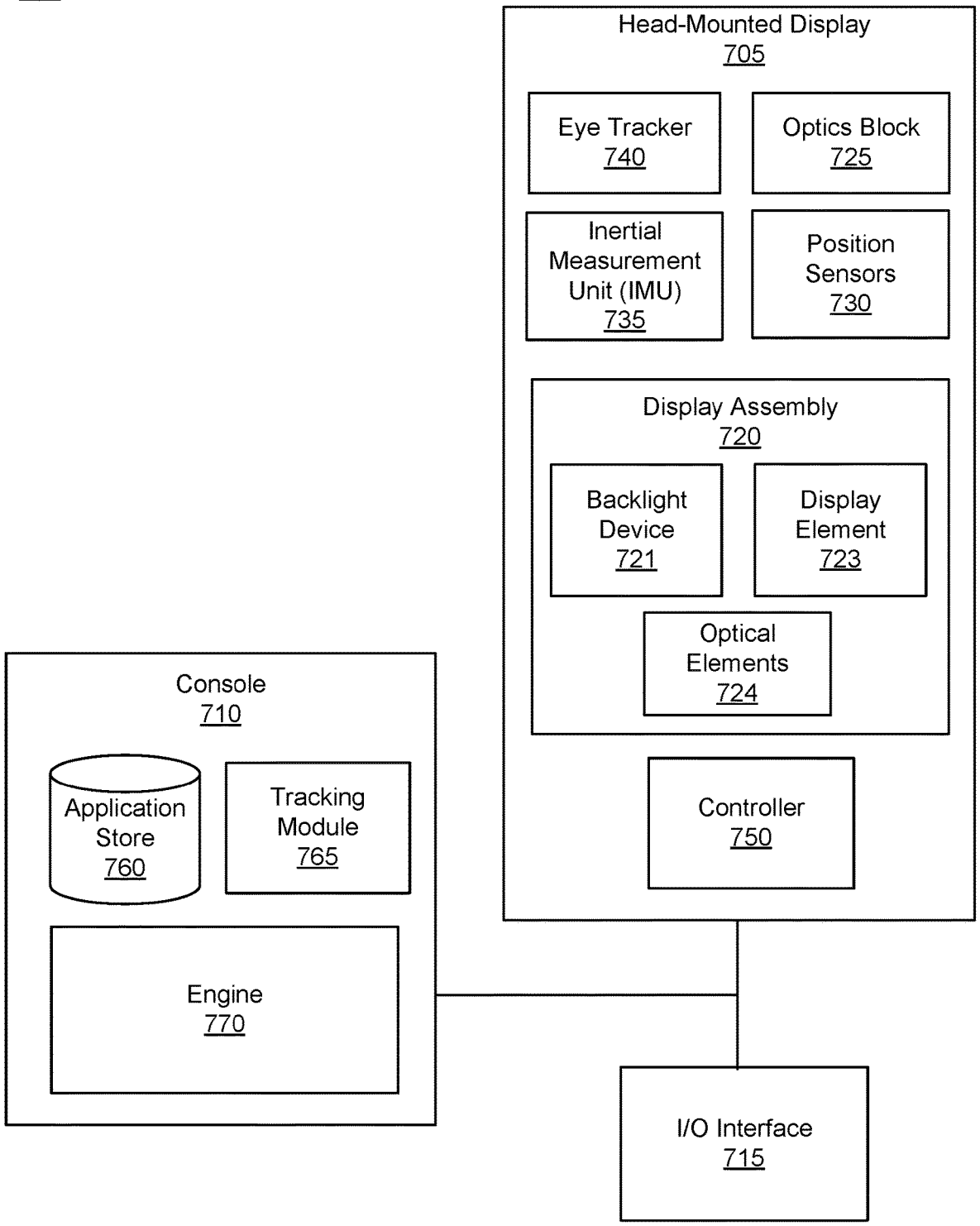
FIG. 7 is a block diagram of a system environment that includes a HMD, in accordance with one or more embodiments.

FIG. 7 is a block diagram of a system environment that includes a HMD, in accordance with one or more embodiments. The system 700 may operate in an artificial reality environment, e.g., a virtual reality, an augmented reality, a mixed reality environment, or some combination thereof. The system 700 shown by FIG. 7 comprises a HMD 705 and an input/output (I/O) interface 715 that is coupled to a console 710. While FIG. 7 shows an example system 700 including one HMD 705 and on I/O interface 715, in other embodiments any number of these components may be included in the system 700. For example, there may be multiple HMDs 705 each having an associated I/O interface 715, with each HMD 705 and I/O interface 715 communicating with the console 710. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 710 is provided by the HMD 705.

The HMD 705 presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the HMD 705, the console 710, or both, and presents audio data based on the audio information. The HMD 705 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. One embodiment of the HMD 705 is the HMD 100 of FIG. 1A. Another embodiment of the HMD 705 is the HMD 100 of FIG. 1B.

The HMD 705 may include a display assembly 720, an optics block 725, one or more position sensors 730, an inertial measurement unit (IMU) 735, an eye tracker 740, and a controller 750. Some embodiments of the HMD 705 have different and/or additional components than those described in conjunction with FIG. 7. Additionally, the functionality provided by various components described in conjunction with FIG. 7 may be differently distributed among the components of the HMD 705 in other embodiments.

The display assembly 720 displays two-dimensional or three-dimensional images to the user in accordance with data received from the console 710. In various embodiments, the display assembly 720 comprises a single display or multiple displays (e.g., a display for each eye of a user). The display assembly 720 may include a backlight device 721, a display element 723, and one or more optical layers 724. An embodiment of the display assembly 720 is the display assembly 210.

The backlight device 721 emit light through the display element 723. The backlight device 721 may include a plurality of light sources (e.g., two-dimensional array of LEDs). At least a portion of the plurality of light sources may be dynamically assigned to a plurality of regions based at least in part on gaze information determined by the eye tracker 740. Each subset of the light sources dynamically assigned to a respective region may emit a portion of the light having brightness adjusted by a respective adjustment value in accordance with emission instructions (e.g., provided by the controller 750). An embodiment of the backlight device 721 is the backlight device 245, the backlight device 305, the backlight device 400, or the backlight device 505.

The display element 723 may spatially modulate the light received from the backlight device 721 to generate image light for presentation to a user wearing the HMD 705. An example of the display element 723 that operates as a spatial light modulator is a liquid crystal display (LCD). An embodiment of the display element 723 is the display element 255.

The one or more optical elements 724 may process the light emitted from the backlight device 721 before the light reaches the display element 723. For example, the one or more optical elements 724 may diffuse and/or polarize the light emitted from the backlight device 721. The one or more optical elements 724 may further optically correct the image light generated by the display element 723. Embodiments of the one or more optical layers 724 are the optical element 252 and/or the optical element 257.

The optics block 725 magnifies the image light received from the display assembly 720, corrects optical errors associated with the image light, and presents the corrected image light to a user of the HMD 705. In various embodiments, the optics block 725 includes one or more optical elements. Example optical elements included in the optics block 725 include: an aperture, a Fresnel lens, a convex lens, a concave lens, a filter, a reflecting surface, or any other suitable optical element that affects image light. Moreover, the optics block 725 may include combinations of different optical elements. In some embodiments, one or more of the optical elements in the optics block 725 may have one or more coatings, such as partially reflective or anti-reflective coatings.

Magnification and focusing of the image light by the optics block 725 allows the display assembly 720 to be physically smaller, weigh less, and consume less power than larger displays. Additionally, magnification may increase the field of view of the content presented by the display assembly 720. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 725 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 725 corrects the distortion when it receives image light from the electronic display generated based on the content.

The IMU 735 is an electronic device that generates data indicating a position of the HMD 705 based on measurement signals received from one or more of the position sensors 730. A position sensor 730 generates one or more measurement signals in response to motion of the HMD 705. Examples of position sensors 730 include: one or more accelerometers, one or more gyroscopes, one or more magnetometers, another suitable type of sensor that detects motion, a type of sensor used for error correction of the IMU 735, or some combination thereof. The position sensors 730 may be located external to the IMU 735, internal to the IMU 735, or some combination thereof. An embodiment of the position sensor 735 is the position sensor 130.

The eye tracker 740 may track a position of an eye of a user wearing the HMD 705. In one or more embodiments, the eye tracker 740 captures images of the user's eye, and provides the captured images to the controller 750 for determining a gaze position for the user's eye. In one or more other embodiments, an internal controller of the eye tracker 740 determines the gaze position for the user's eye. Information about the gaze position may include information about a position of a pupil of the user's eye. An embodiment of the eye tracker 740 is the eye tracker 215.

The controller 750 may control components of the display assembly 720 and the eye tracker 740. The controller 750 may generate tracking instructions for the eye tracker. In some embodiments, the controller 750 receives one or more images of the user's eye 220 captured by the eye tracker 740 and determines eye tracking information (i.e., gaze information or gaze position) using the captured images. The controller 750 may further generate emission instructions for the display assembly 720 based at least in part on the gaze information. The controller 750 may provide the emission instructions to the backlight device 721. The emission instructions from the controller 750 may include electrical signals (e.g., voltage signals or current signals) that control light emission from the backlight device 721 of specific brightness distribution. In some embodiments, the controller 750 dynamically assigns at least a portion of light sources in the backlight device 721 to multiple regions using the emission instructions. Each subset of the light sources in the backlight device 721 dynamically assigned to a respective region in accordance with the emission instructions from the controller 750 may emit a portion of the light having brightness adjusted by a respective adjustment value in accordance with the emission instructions. An embodiment of the controller 750 is the controller 270 or the controller 315.

The I/O interface 715 is a device that allows a user to send action requests and receive responses from the console 710. An action request is a request to perform a particular action. For example, an action request may be an instruction to start or end capture of image or video data or an instruction to perform a particular action within an application. The I/O interface 715 may include one or more input devices. Example input devices include: a keyboard, a mouse, a game controller, or any other suitable device for receiving action requests and communicating the action requests to the console 710. An action request received by the I/O interface 715 is communicated to the console 710, which performs an action corresponding to the action request. In some embodiments, the I/O interface 715 includes an IMU 735 that captures calibration data indicating an estimated position of the I/O interface 715 relative to an initial position of the I/O interface 715. In some embodiments, the I/O interface 715 may provide haptic feedback to the user in accordance with instructions received from the console 710. For example, haptic feedback is provided when an action request is received, or the console 710 communicates instructions to the I/O interface 715 causing the I/O interface 715 to generate haptic feedback when the console 710 performs an action.

The console 710 provides content to the HMD 705 for processing in accordance with information received from one or more of: the eye tracker 740, the controller 750, and the I/O interface 715. In the example shown in FIG. 7, the console 710 includes an application store 760, a tracking module 765, and an engine 770. Some embodiments of the console 710 have different modules or components than those described in conjunction with FIG. 7. Similarly, the functions further described below may be distributed among components of the console 710 in a different manner than described in conjunction with FIG. 7.

The application store 760 stores one or more applications for execution by the console 710. An application is a group of instructions, that when executed by a processor, generates content for presentation to the user. Content generated by an application may be in response to inputs received from the user via movement of the HMD 705 or the I/O interface 715. Examples of applications include: gaming applications, conferencing applications, video playback applications, or other suitable applications.

The tracking module 765 calibrates the system 700 using one or more calibration parameters and may adjust one or more calibration parameters to reduce error in determination of the position of the HMD 705 or of the I/O interface 715. For example, the tracking module 765 communicates a calibration parameter to the eye tracker 740 to adjust the focus of the eye tracker 740 to determine a gaze position of a user's eye more accurately. Calibration performed by the tracking module 765 also accounts for information received from the IMU 735 in the HMD 705 and/or an IMU included in the I/O interface 715. Additionally, if tracking of the HMD 705 is lost, the tracking module 765 may re-calibrate some or all of the system 700.

The tracking module 765 tracks movements of the HMD 705 or of the I/O interface 715 using information from the one or more position sensors 730, the IMU 735, or some combination thereof. For example, the tracking module 765 determines a position of a reference point of the HMD 705 in a mapping of a local area based on information from the HMD 705. The tracking module 765 may also determine positions of the reference point of the HMD 705 or a reference point of the I/O interface 715 using data indicating a position of the HMD 705 from the IMU 735 or using data indicating a position of the I/O interface 715 from an IMU 735 included in the I/O interface 715, respectively. Additionally, in some embodiments, the tracking module 765 may use portions of data indicating a position or the HMD 705 from the IMU 725 to predict a future location of the HMD 705. The tracking module 765 provides the estimated or predicted future position of the HMD 705 or the I/O interface 715 to the engine 770.

The engine 770 generates a three-dimensional mapping of the area surrounding the HMD 705 (i.e., the "local area") based on information received from the HMD 705. In some embodiments, the engine 770 determines depth information for the three-dimensional mapping of the local area that is relevant for techniques used in computing depth. The engine 770 may calculate depth information using one or more techniques in computing depth, such as the stereo based techniques, the structured light illumination techniques, and the time-of-flight techniques. In various embodiments, the engine 770 uses the depth information to, e.g., update a model of the local area, and generate content based in part on the updated model.

The engine 770 also executes applications within the system 700 and receives position information, acceleration information, velocity information, predicted future positions, or some combination thereof, of the HMD 705 from the tracking module 765. Based on the received information, the engine 770 determines content to provide to the HMD 705 for presentation to the user. For example, if the received information indicates that the user has looked to the left, the engine 770 generates content for the HMD 705 that mirrors the user's movement in a virtual environment or in an environment augmenting the local area with additional content. Additionally, the engine 770 performs an action within an application executing on the console 710 in response to an action request received from the I/O interface 715 and provides feedback to the user that the action was performed. The provided feedback may be visual or audible feedback via the HMD 705 or haptic feedback via the I/O interface 715.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display assembly comprising:
   a display element;
   a backlight device comprising a plurality of light sources that emit light through the display element that spatially modulates light received from the backlight device to generate image light for presentation to a user, each subset of the plurality of light sources dynamically assigned to a respective brightness region of a plurality of brightness regions is configured to emit a portion of the light having a level of brightness adjusted by a respective adjustment value in accordance with emission instructions; and
   a controller configured to:
      obtain gaze information for an eye of the user including a point of a gaze of the eye,
      generate the emission instructions based at least in part on the gaze information,
      dynamically assign at least a portion of the plurality of light sources to the plurality of brightness regions based at least in part on the gaze information, wherein one of the plurality of brightness regions includes the point of the gaze,
      set the respective adjustment value based on a distance from a geometric center of the respective brightness region to the point of the gaze, and
      adjust a size of the respective brightness region as a function of the distance from the geometric center of the respective brightness region to the point of the gaze.

2. The display assembly of claim 1, wherein the controller is further configured to set the respective adjustment value to a higher value for the respective brightness region that is further from the point of the gaze.

3. The display assembly of claim 1, wherein the controller is further configured to set the respective adjustment value to a lowest value among a plurality of adjustment values for the respective brightness region that corresponds to the point of the gaze.

4. The display assembly of claim 1, wherein a size of the one of the plurality of brightness regions that includes the point of the gaze is fixed.

5. The display assembly of claim 1, wherein the controller is further configured to:
   load a plurality of adjustment values from a non-transitory computer readable medium coupled to the controller based at least in part on the gaze information; and
   generate the emission instructions using the loaded plurality of adjustment values.

6. The display assembly of claim 1, wherein the gaze information further comprise information about a position of a pupil of the eye.

7. The display assembly of claim 1, wherein each of the plurality of light sources comprises a light emission diode (LED).

8. The display assembly of claim 1, wherein the plurality of light sources comprises a two-dimensional array of light emission diodes (LEDs).

9. The display assembly of claim 1, wherein the display assembly is part of a headset, and the headset further comprises an eye tracker configured to:
   determine the gaze information; and
   provide the gaze information to the controller.

10. A method comprising:
    obtaining gaze information for an eye of a user including a point of a gaze of the eye;
    generating emission instructions based at least in part on the gaze information;
    dynamically assigning at least a portion of a plurality of light sources of a backlight device to a plurality of brightness regions based at least in part on the gaze information, wherein one of the plurality of brightness regions includes the point of the gaze;
    emitting light from the plurality of light sources of the backlight device through a display element that spatially modulates the light received from the backlight device to generate image light for presentation to the user such that each subset of the light sources dynamically assigned to a respective brightness region of the plurality of brightness regions emits a portion of the light having a level of brightness adjusted by a respective adjustment value in accordance with the emission instructions;
    setting the respective adjustment value based on a distance from a geometric center of the respective brightness region to the point of the gaze; and
    adjusting a size of the respective brightness region as a function of the distance from the geometric center of the respective brightness region to the point of the gaze.

11. The method of claim 10, further comprising:
setting the respective adjustment value to a higher value for the respective brightness region that is further from the point of the gaze.

12. The method of claim 10, further comprising:
setting the respective adjustment value to a lowest value among a plurality of adjustment values for the respective brightness region that corresponds to the point of the gaze.

13. A headset comprising:
a display element;
an eye tracker configured to determine gaze information for an eye of a user wearing the headset, the gaze information including a point of a gaze of the eye;
a backlight device comprising a plurality of light sources that emit light through the display element, the display element configured to spatially modulate the light received from the backlight device to generate image light for presentation to the user, each subset of the plurality of light sources dynamically assigned to a respective brightness region of a plurality of brightness regions is configured to emit a portion of the light having a level of brightness adjusted by a respective adjustment value in accordance with emission instructions;
a controller configured to:
receive the gaze information from the eye tracker,
generate the emission instructions based at least in part on the gaze information,
dynamically assign at least a portion of the plurality of light sources to the plurality of brightness regions based at least in part on the gaze information, wherein one of the plurality of brightness regions includes the point of the gaze,
set the respective adjustment value based on a distance from a geometric center of the respective brightness region to the point of the gaze, and
adjust a size of the respective brightness region as a function of the distance from the geometric center of the respective brightness region to the point of the gaze; and
an optical assembly configured to direct the image light to an eye-box of the headset corresponding to a location of the eye.

* * * * *